United States Patent
Hirai et al.

[19]

[11] Patent Number: 6,139,338
[45] Date of Patent: Oct. 31, 2000

[54] CF CARD ADAPTER

[75] Inventors: Yuji Hirai; Kenichi Yotsutani, both of Tokyo, Japan

[73] Assignee: Honda Tsushin Kogyo Co., Ltd., Tokyo, Japan

[21] Appl. No.: 09/287,095

[22] Filed: Apr. 7, 1999

[30] Foreign Application Priority Data

Dec. 25, 1998 [JP] Japan .................................. 10-371393

[51] Int. Cl.[7] .................................................. H01R 13/44
[52] U.S. Cl. .......................................................... 439/141
[58] Field of Search .................................. 439/141, 140, 439/289, 357, 274, 260

[56] References Cited

U.S. PATENT DOCUMENTS 5,035,633  7/1991  Kobayashi et al. ..................... 439/140
5,779,491  7/1998  Nagano et al. .......................... 439/141
5,924,879  7/1999  Kameyama .............................. 439/141

*Primary Examiner*—Neil Abrams
*Assistant Examiner*—J. F. Duverne
*Attorney, Agent, or Firm*—Arent Fox Kintner Plotkin & Kahn PLLC

[57] ABSTRACT

A compatible CF card adapter (1) permits a thick or thin CF card (7) to be nested therewith. The CF card adapter includes pin contacts (4a) projecting from a housing (4b) for mating with the female contacts of the CF card. The CF card adapter has a slidable contact cover (4f) spring-biased to enclose the pin contacts (4a). The contact cover (4f) is responsive to insertion of the CF card for yieldingly withdrawing to expose the pin contacts (4a) behind, thereby permitting the pin contacts (4a) to be mated with the receptacle terminals of the CF card.

8 Claims, 5 Drawing Sheets

Rear side ← → Front side

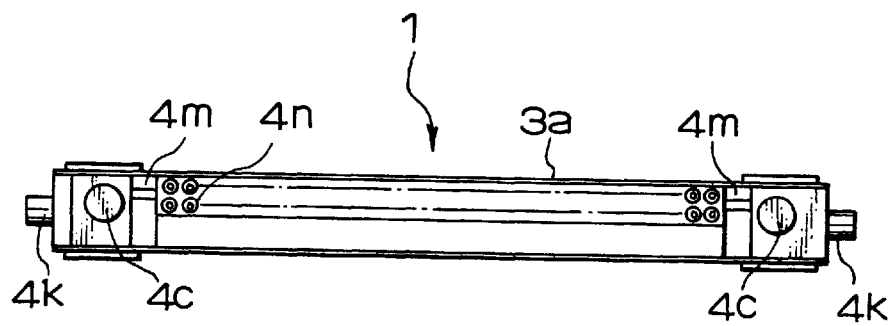
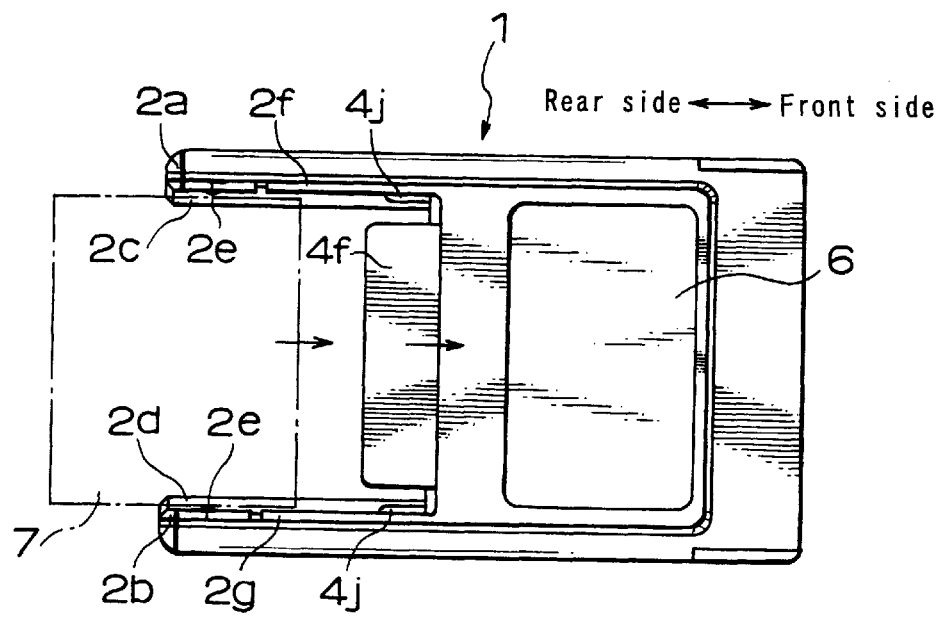
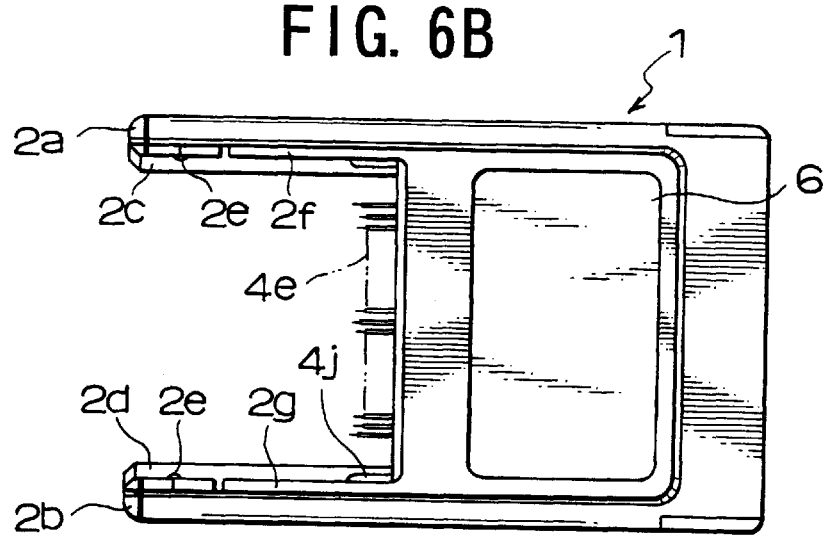

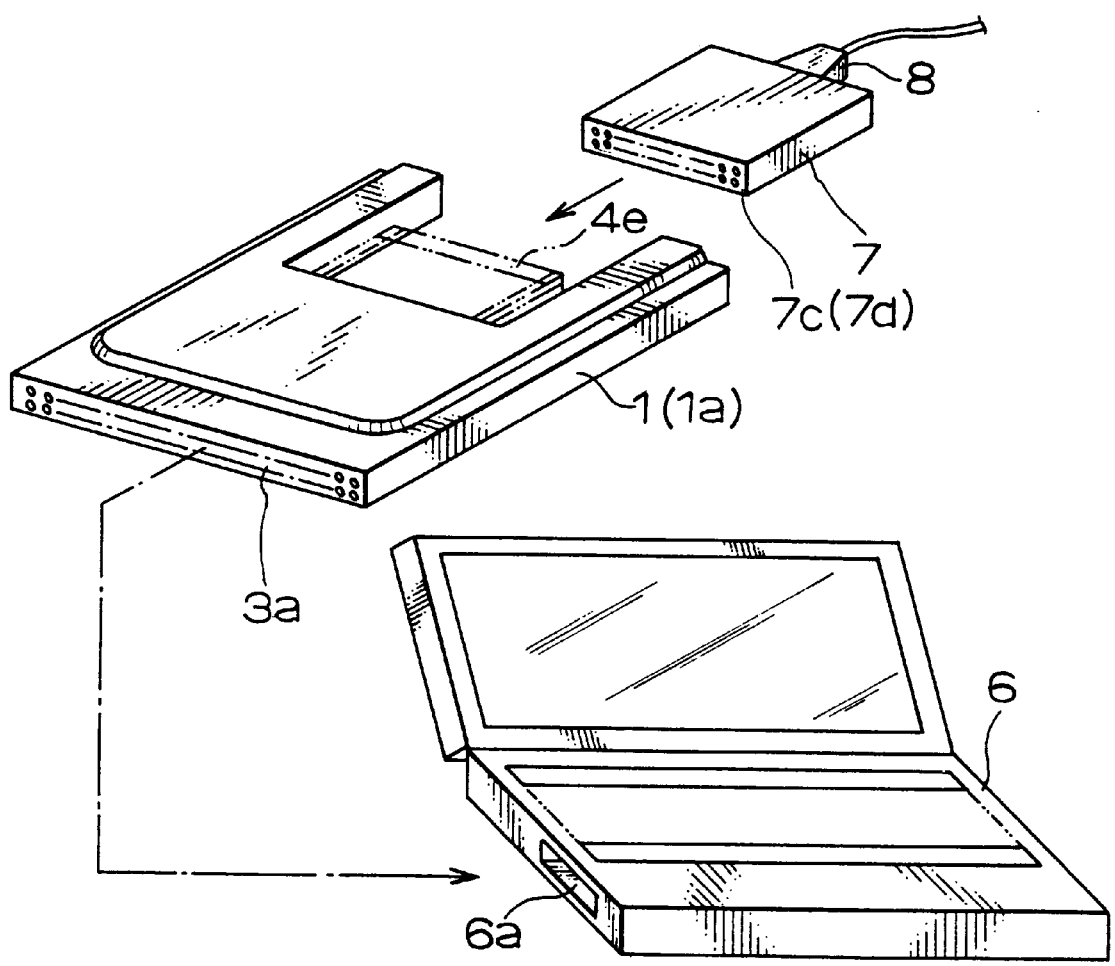

CF CARD ADAPTER

BACKGROUND OF THE INVENTION

1. Field of the Invention

The present invention relates to a card adapter for use in a personal computer or the like, which can expand its capabilities by using PC cards, and more particularly to a CF card adapter which apparently increases the relatively small size of a CF card ("compact flush" card abbreviated as such) to be equal to the relatively large size of a PC card, thereby permitting the small-sized card to be snugly inserted and mated with the card receptacle of the personal computer or the like.

2. Description of Related Art

As is well known, CF cards are used in digital phones, digital cameras, LAN devices or modems via associated I/O connectors, and are often used as memories. Such CF cards are small, compared with PC cards, and therefore, personal computers must be equipped with extra intervenient or interface connectors to be exclusively used for such small-sized cards. Referring to FIG. 7, an adapter 1a is used for permitting an electronic device 6 to accommodate a CF card 7 indirectly. Specifically, the small-sized card 7 is inserted and mated with the adapter 1a, thereby making the small-sized card 7 to be as large as the PC card. Then, the CF card 7 can be used in a personal computer 6 by inserting the adapter 1a having the CF card 7 press-fitted therein for union into the receptacle 6a of the personal computer 6.

There are, however, two CF cards of different sizes. One of these CF cards 7a and 7b is 3.3 mm thick, and the other 5 mm thick. Compatible adapters 1a which are designed for these two different CF cards have no choice but to allow their contact pins to be exposed. CF adapters are 5 millimeter thick, and therefore, if such adapters are designed to accommodate 3.3 millimeter-thick CF cards, the significant thickness difference permits a cover to be formed in the adapter housing for covering the pin contacts projecting from the housing against contamination or bending in use. Such dust-proof, anti-bending cover, however, cannot be formed in case that the adapter is designed to accommodate 5 millimeter-thick CF cards; the adapter is 5 millimeters thick, and is as thick as the thick card 7b.

A compatible CF card connector, therefore, has no choice but to allow the pin contacts to be exposed, thus unsettling the problem of being contaminated or bent by external force.

SUMMARY OF THE INVENTION

One object of the present invention is to provide a compatible CF card connector which permits its pin terminals to be protected against contamination or bending no matter which CF card may be used, thin or thick.

To attain this object a CF card adapter having a plurality of pin contacts projecting from its housing to mate with the female contacts of a CF card when inserted, is improved according to the present invention in that it has a slidable contact cover enclosing the pin contacts, the slidable contact cover being responsive to insertion of the CF card for yieldingly withdrawing to expose the pin contacts, thereby permitting insertion into the female contacts of the CF card.

The slidable contact cover may be spring-biased toward an FC card to be inserted.

Other objects and advantages of the present invention will be understood from the following description of a compatible CF card adapter according to one preferred embodiment of the present invention, which is shown in accompanying drawings.

BRIEF DESCRIPTION OF THE DRAWINGS

FIG. 5 is a front view of the pin header;

FIGS. 6A and 6B show how a CF card is inserted in the compatible CF card adapter;

FIG. 7 shows how a CF card can be used in a personal computer with the aid of the interface adapter;

DESCRIPTION OF THE PREFERRED EMBODIMENTS

Figure 1:
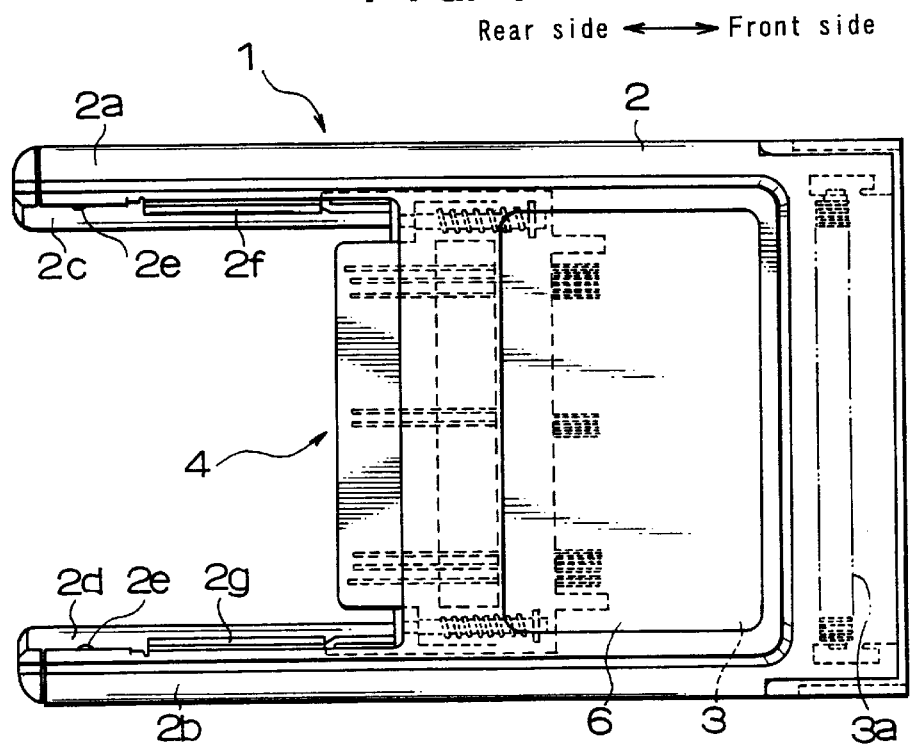
FIG. 1 is a plane view of a compatible CF card adapter according to the present invention.
Figure 2A:
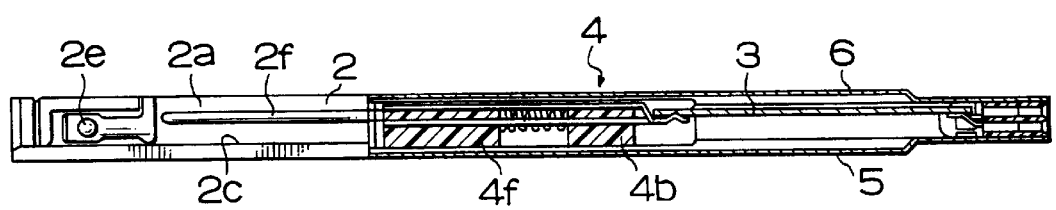
FIGS. 2A, 2B and 2C are a longitudinal section, a side view and a front view of the compatible CF card adapter respectively.
Figure 2B:
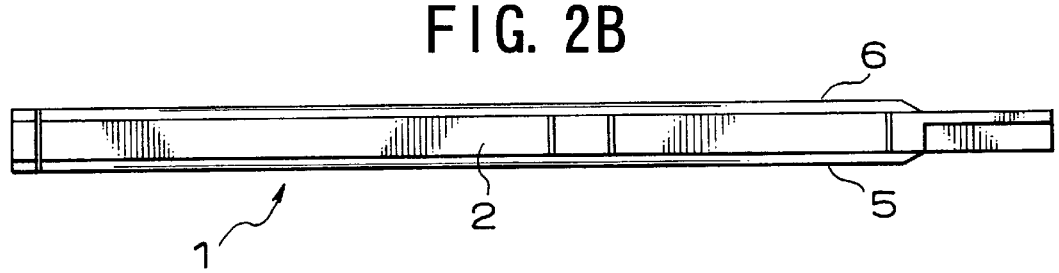
Figure 2C:
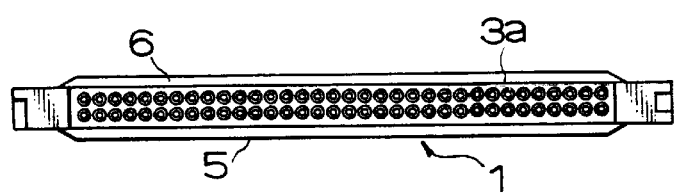

Referring to FIGS. 1 and 2, a CF card adapter 1 comprises a "U"-shaped thin (5 millimeter-thick) plastic frame 2, an adapter substrate 3 integrally connected to the front side of the "U"-shaped plastic frame 2, a pin header 4 having pin contacts 4a to mate with a CF card 7 (see FIGS. 8 and 9) when inserted from the rear side of the frame 2, and top and bottom metal covers 5 and 6 covering the top and bottom of the frame 2.

The "U"-shaped frame 2 has a receptacle connector part 3a exposed on its front side, and the opposite legs 2a and 2b of the frame 2 define a receptacle space to accommodate a CF card 7. Each leg 2a or 2b has a lower flat guide 2c or 2d and a guide rail 2f or 2g formed on its end. In addition to the guiding function the guide rail 2f or 2g effectively prevents the terminal contacts from being badly loaded and deformed when the card 7 is raised or lowered in the "U"-shaped frame 2. Also, the guide rail 2f or 2g effectively prevents wrong orientation of a card 7 relative to the adapter.

Also, each leg 2a or 2b has a spring-biased semi-spherical projection 2e formed in the vicinity of the leg end. The semi-spherical projection 2e extends from the bottom metal cover 6 for making an electric contact with the outer metal shield of a CF card 7 when inserted in the adapter 1, thus grounding the card 7.

Figure 3:
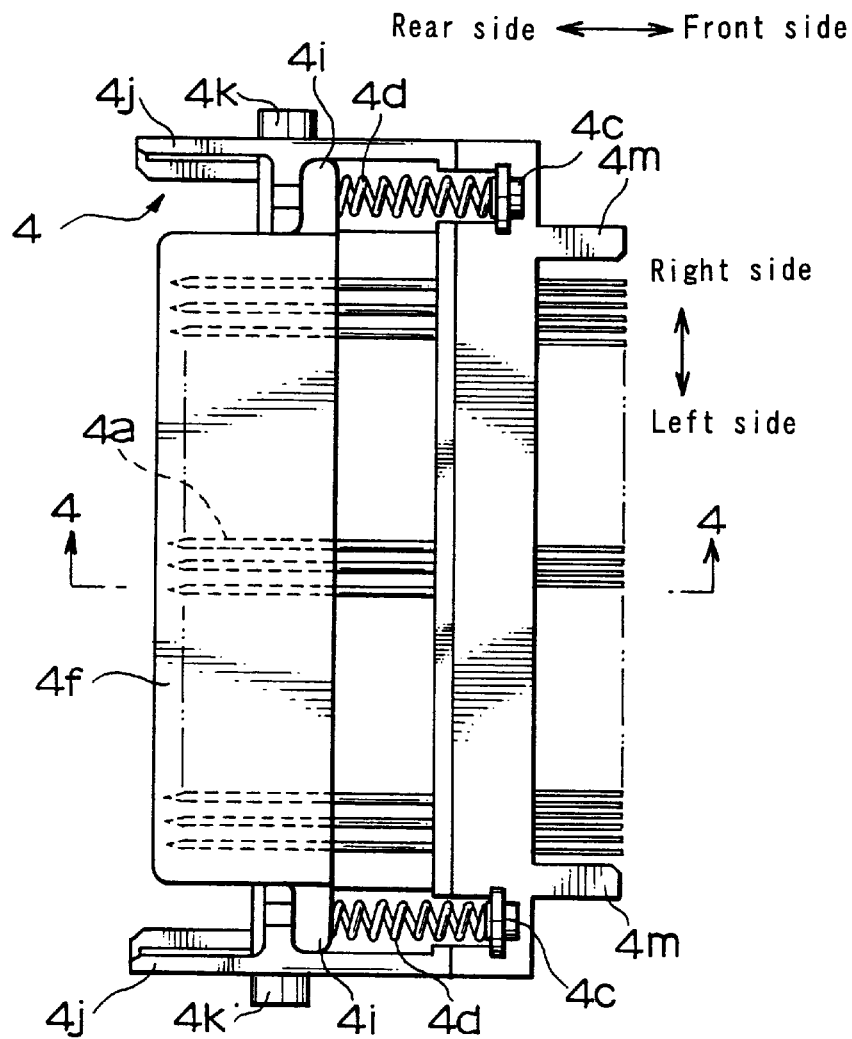
FIG. 3 is a plane view of the pin header of the compatible CF card adapter.
Figure 4:
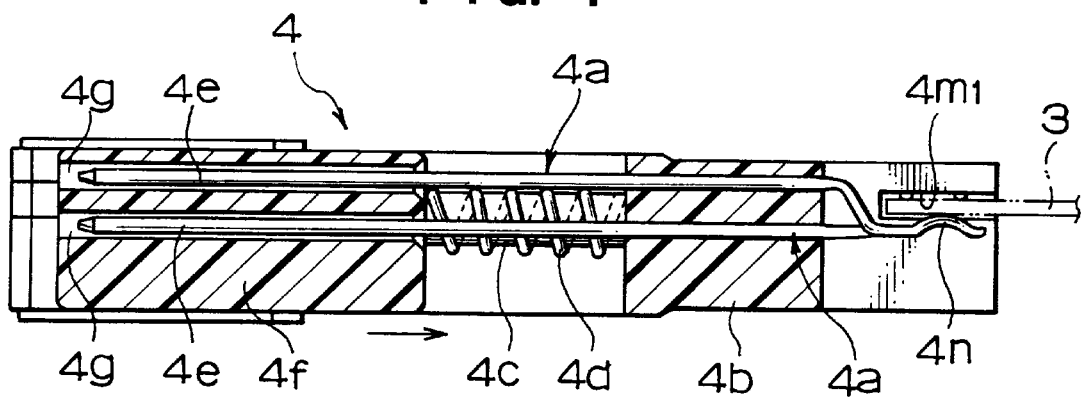
FIG. 4 is a longitudinal section of the pin header taken along the line 4—4 in FIG. 3.
Figure 8A:
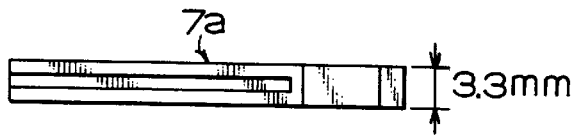
FIGS. 8A, 8B, 8C and 8D are side, front, plane and rear views of a 3.3 millimeter-thick CF card.
Figure 8B:
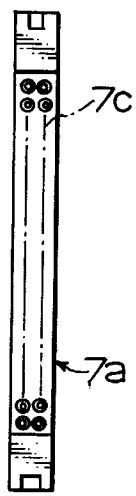
Figure 8C:
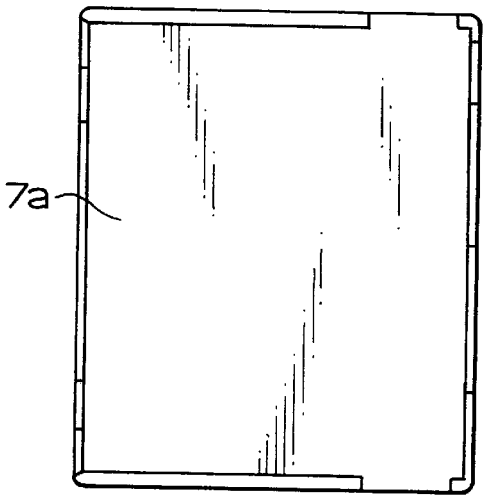
Figure 8D:
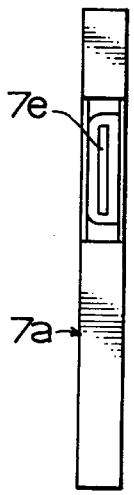
Figure 9A:
FIGS. 9A, 9B, 9C and 9D are side, front, plane and rear views of a 5.0 millimeter-thick CF card.
Figure 9B:
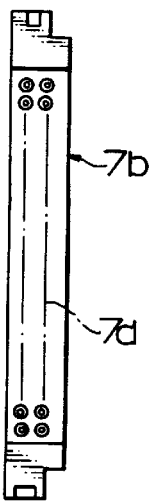
Figure 9C:
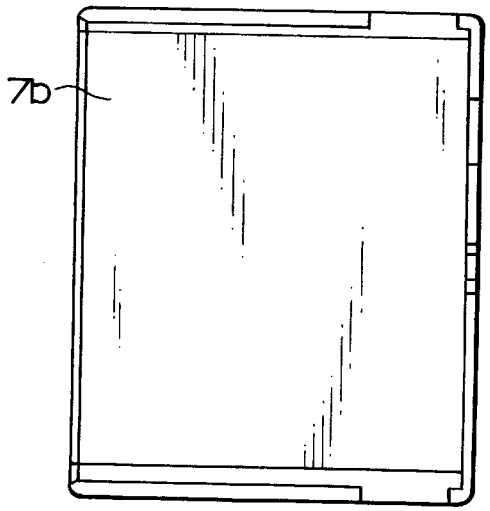
Figure 9D:
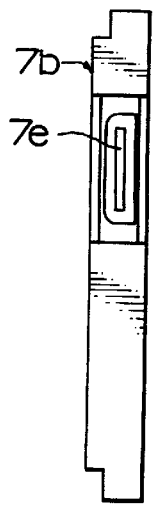

Referring to FIGS. 3 to 5, the pin header 4 has a plurality of pin contacts 4a embedded in the plastic header housing 4b, and the pin header 4 has two round rods 4c longitudinally extending rearward on the opposite sides of the header housing 4b. Each round rod 4c has a coiled spring 4d loosely encircling therearound. The pin header 4 has a plastic cover (or terminal protector) 4f to cover the rear portions 4e of the pin contacts 4a. The cover 4f has laterally opposite hollow extensions 4i slidably fitted around the round rods 4c, permitting the cover 4f to be guided in moving back and forth. With this arrangement the cover 4f is driven rearward all the time under the resilient force, so that the cover 4f may be allowed to move back and forth within certain limits.

The plastic cover 4f has a predetermined number of through holes 4g made therein for accommodating the pin contacts 4a of the pin header 4. These through holes 4g may be made and arranged each for each through hole to confront the pin contacts 4g in one-to-one correspondence relation, thereby increasing the resistance of each pin contact to a possible bending force, and at the same time assisting the pin contacts 4a in keeping them in good order. In place of such through holes two laterally elongated slots may be used, each allotted to each lateral arrangement of pin terminals 4a.

As seen from FIG. 3, the pin header 4 has two rear legs 4j and lateral frame-engagement projections 4k formed on its opposite sides. Each rear leg 4j has a card-guiding shelf 2c or 2d formed on its bottom, and the frame-engagement projections 4k permit the pin header 4 to be fixed in the frame 2 in position. Also, the pin header 4 has two front legs 4m formed on its front side, defining a rectangular receptacle space, in which the curved tips 4n of the pin contacts 4a appear to mate with the terminals of the adapter substrate 3 when inserted in the receptacle space (see FIG. 4). Each front leg 4m has a longitudinal recess $4m_1$ made on its inner surface, thus permitting the rear, opposite side portions of the adapter substrate 3 to be fitted snugly therein.

Referring to FIG. 6A, a 5.0 or 3.3 millimeter-thick card 7 is inserted from the rear side of the CF card adapter 1 while allowing the opposite longitudinal sides of the card to slide on the card guide shelves 2c and 2d in the direction indicated by arrows. After the front end of the CF card 7 abuts on the cover 4f, the CF card 7 pushes the cover 4f, thereby making the cover 4f to be yieldingly withdrawn. Accordingly the rear ends 4e of the pin contacts 4a are allowed to be exposed, so that the female contacts of the CF card 7c or 7d (see FIGS. 8 and 9) are mated with the pin contacts 4a of the pin header 4, making a required electric connection.

When the CF card 7 is put in the space defined between the opposite legs 2a and 2b of the "U"-shaped frame 2, the outer shield of the CF card 7 is put in contact with the outer shield of the CF card adapter 1 via the spring-biased semi-spherical projections 2e, thereby grounding the CF card 7. At the same time, the CF card 7 is caught by the spring-biased semi-spherical projections 2e, preventing the CF card 7 from sliding off from the CF card adapter 1. The CF card 7 clicks to indicate when it is fully inserted in the CF card adapter 1.

Thus, the CF card adapter 1 is nested with the CF card 7, which is connected to a telephone or the like via an associated I/O connector 8, which is inserted in the receptacle 7e of the CF card 7. Then, the adapter 1 having the CF card 7 nested therewith, is inserted in the card slot 6a of a note-sized personal computer or mobile computer 6, as seen from FIG. 7.

When the adapter 1 is removed from the notebook-sized personal computer or mobile computer 6, the cover 4f follows the withdrawing adapter 1 under the resilient influence to cover the rear ends 4e of the pin contacts 4a.

What is claimed is:

1. A CF card adapter for providing a connector interface between a CF card and an electronic device comprising:

a housing;

a plurality of pin terminals projecting from said housing for mating with female contacts of a CF card;

a spring-biased semi-spherical projection for grounding the CF card; and a slidable contact cover enclosing said plurality of pin terminals;

wherein said slidable contact cover slides to expose said plurality of pin contacts to permit insertion of the pin contacts into female contacts of a CF card.

2. A CF card adapter according to claim 1, wherein the slidable contact cover is spring-biased toward a CF card to be inserted in the adapter.

3. A CF card adapter according to claim 1, wherein said CF card adapter is universal and fits CF cards of all thicknesses.

4. A CF card adapter according to claim 1, further comprising a receptacle connector part.

5. A CF card adapter according to claim 1, further comprising a u-shaped plastic frame.

6. A CF card adapter according to claim 1, further comprising a guide rail.

7. A CF card adapter according to claim 1, wherein said slidable contact cover comprises through holes for accommodating said pin connectors.

8. A CF card adapter according to claim 1, wherein said pin contacts comprise a curved tip.

* * * * *